United States Patent [19]

Bergmann et al.

[11] Patent Number: 5,154,869
[45] Date of Patent: Oct. 13, 1992

[54] CABLE CONDUIT WITH RIDGED INNER WALL

[75] Inventors: Horst Bergmann, Babenhausen; Horst Vogelsang, Herten, both of Fed. Rep. of Germany

[73] Assignee: Ernst Vogelsang GmbH & Co. KG, Herten/Westf., Fed. Rep. of Germany

[21] Appl. No.: 699,381

[22] Filed: May 13, 1991

[30] Foreign Application Priority Data

May 24, 1990 [DE] Fed. Rep. of Germany ....... 4016726

[51] Int. Cl.$^5$ .............................................. D01D 5/20
[52] U.S. Cl. .................................. 264/167; 138/108; 138/121; 174/68.3; 174/97; 264/173; 264/209.2
[58] Field of Search ...................... 174/68.3, 72 C, 95, 174/97; 138/108, 121, 173; 264/145, 148, 177.14, 563

[56] References Cited

U.S. PATENT DOCUMENTS

| | | | |
|---|---|---|---|
| 3,240,233 | 3/1966 | Johnston | 138/108 |
| 4,410,012 | 10/1983 | Redding et al. | 138/121 |
| 4,688,890 | 8/1987 | DeMeo et al. | 138/111 X |
| 4,892,442 | 1/1990 | Shoffner | 138/141 X |
| 5,027,864 | 7/1991 | Conti et al. | 138/177 |
| 5,038,834 | 8/1991 | Siegfried | 138/108 X |

FOREIGN PATENT DOCUMENTS

| | | |
|---|---|---|
| 3217401 | 11/1983 | Fed. Rep. of Germany . |
| 3529541 | 2/1987 | Fed. Rep. of Germany . |
| 19703 | 6/1973 | Japan ................................. 264/563 |
| 2024 | of 1888 | United Kingdom ................ 138/173 |

*Primary Examiner*—Morris H. Nimmo
*Attorney, Agent, or Firm*—Herbert Dubno; Andrew M. Wilford

[57] ABSTRACT

An electrical conduit for wires or cables is formed by a tube extending along a longitudinal axis and having an inner wall formed with a plurality of longitudinally throughgoing ridges each formed by a plurality of longitudinally joined sections with every other section inclined oppositely relative to the axis to the intervening sections. In other words the ridges run alternately along a right-hand helix and then a left-hand helix. The sections may be of varying pitch and part circular in section. They can also be substantially identical in which case they are straight, meet at corners, and are all of the same pitch.

4 Claims, 3 Drawing Sheets

CABLE CONDUIT WITH RIDGED INNER WALL

FIELD OF THE INVENTION

The present invention relates to a cable conduit. More particularly this invention concerns such a conduit which has a ridged and grooved inner wall.

BACKGROUND OF THE INVENTION

As described in German patent document 3,217,401 and in U.S. patent application Ser. Nos. 07/450,866 (now U.S. Pat. No. 5,069,254) and 07/498,586 (now U.S. Pat. No. 5,036,891) all of H. Vogelsang conduits assemblies are known comprising one or more tubes formed of a synthetic resin and interconnected transversely by longitudinally extending webs. Thus the tubes can be delivered rolled up on spools with the plurality of tubes and their webs in a flat coil. For use they are unwound, cut to length, and then bunched together to form the desired dense array of juxtaposed tubes through which electrical conductors, e.g. wires or cables, are pulled or pushed.

In order to facilitate insertion of the cables German patent document 3,529,541 of H. Vogelsang proposes forming the inner wall of each tube with longitudinally extending ridges alternating with longitudinally extending grooves. These longitudinally continuous and throughgoing formations reduce the contact area between the wires or cables being inserted through them to facilitate such insertion.

A major disadvantage of this arrangement is that the ridges invariably run somewhat along a helix like a screwthread due to the rotation of the worm in the extruder. These helically extending ridges impart some torsion to the electrical conductors being pushed or pulled through the conduit. Hence these conductors can twist up and get jammed, or can just wind about each other to form a bulkier mass than they actually need to.

OBJECTS OF THE INVENTION

It is therefore an object of the present invention to provide an improved method of making an electrical conduit.

Another object is the provision of such an improved electrical conduit which overcomes the above-given disadvantages, that is which allows wires or cables to be inserted without twisting them.

SUMMARY OF THE INVENTION

An electrical conduit for wires or cables is formed by a tube extending along a longitudinal axis and having an inner wall formed with a plurality of longitudinally throughgoing ridges each formed by a plurality of longitudinally joined sections with every other section inclined oppositely relative to the axis to the intervening sections. In other words the ridges run alternately along a right-hand helix and then a left-hand helix. Thus with this arrangement any torsion that the ridges apply to the wires or cables being pulled or pushed through it will be canceled out from one section to the next. In this manner there will be no twisting and bunching of the cables.

According to this invention the sections may be of varying pitch. In this arrangement they are generally part circular.

It is also possible for the sections to be substantially identical in which case they are straight and meet at corners. These sections are all of the same pitch.

The ridges according to this invention are of substantially triangular section. The tube has a predetermined wall thickness measured radially and the ridges have a radial height above the inner wall that is substantially less than the wall thickness. In addition the tube has a predetermined wall thickness measured radially and the ridges have an angular dimension that is substantially less than the wall thickness. The inner wall is formed between the ridges with grooves complementary to the ridges. It is possible for the ridges to be unitary with the tubing. They can also be separate elements that are applied in a separate stage so that the ridges are formed of a synthetic resin having a lower coefficient of friction than the tube.

The conduit according to this invention is made by forcing the tube longitudinally through an annular opening defined internally by a mandrel or die itself formed with peripheral grooves that form the ridges and alternately oppositely rotating the inner tool. The rotation speed of the mandrel is varied continuously to produce ridges of varying pitch. The inner tool itself can operate without removal of material.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
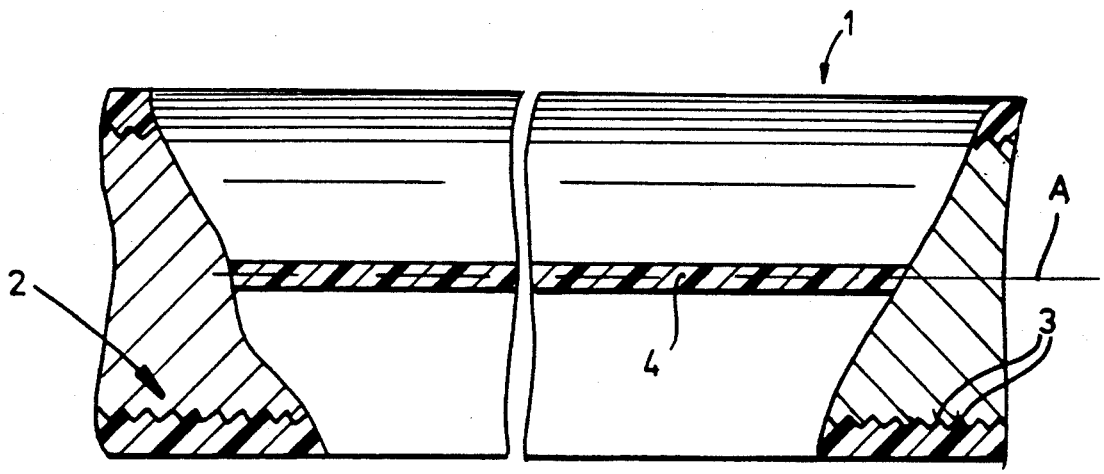
FIG. 1 is a side view partly in section showing a conduit according to the invention.
Figure 2:
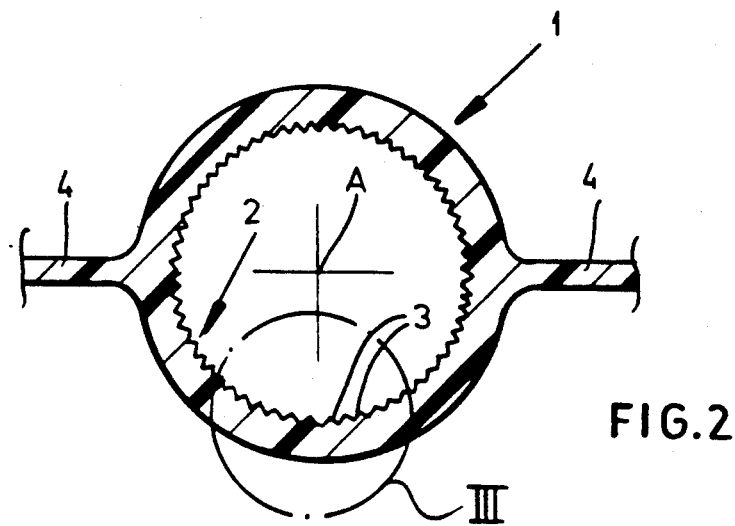
FIG. 2 is a cross section through the conduit.
Figure 3:
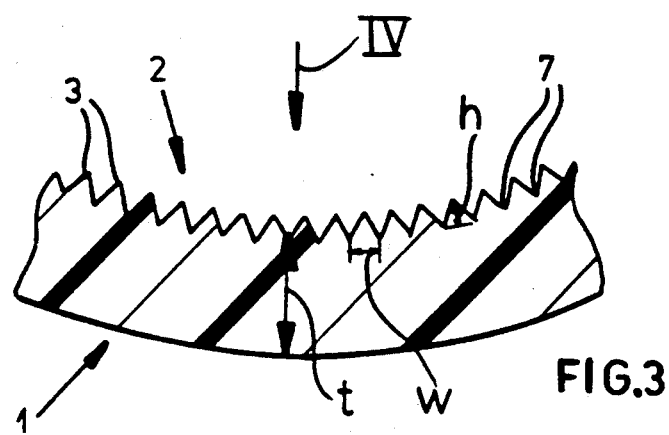
FIG. 3 is a large-scale view of the detail indicated at III in FIG. 2.
Figure 4:
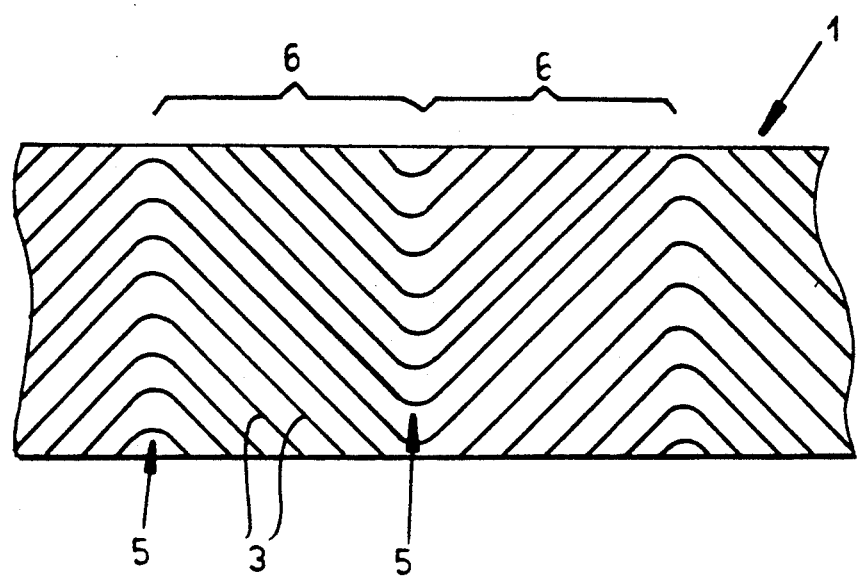
FIG. 4 is a view taken in the direction of arrow IV of FIG. 3.

As seen in FIGS. 1 through 4, a conduit 1 according to the invention is unitarily formed of a durable synthetic resin with webs or flanges 4 that are connected to other such conduits 1 as described in the above-cited patent documents. This conduit tube 1 is centered on a longitudinal axis A and has an inner wall 2 that is cylindrical and also centered on the axis A and that is formed with triangular-section ridges 3 separated by complementary triangular-section grooves 7. The ridges 3 are in turned formed by straight sections 6 of alternating inclination to the axis A and meeting at right-angle corners 5.

Each of the ridges 3 has a radial height h and an angular width w that is equal to a small fraction, here about one-fourth, of the radial thickness t of the tube 1. In addition the grooves 7 are perfectly complementary to the ridges 3.

Figure 7:
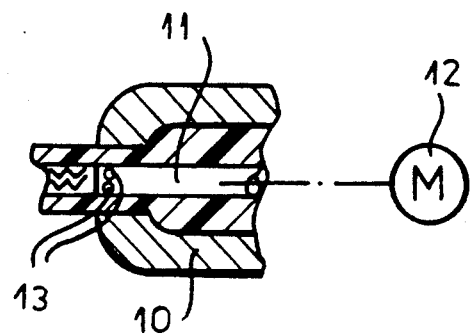
FIGS. 7 and 8 are largely diagrammatic small-scale views illustrating the manufacture of the conduits according to the invention.

Such a conduit 1 is made as shown in FIG. 7 in an extruder 10 having a mandrel 11 that can be rotated by a motor 12 and that is formed with radially projecting ridges 13. As the resin is extruded through the annular opening formed between the elements 10 and 11, the mandrel 11 is rotated by the motor 12 first in one direction, then in the other, to produce the alternating-direction ridges 3.

Figure 5:
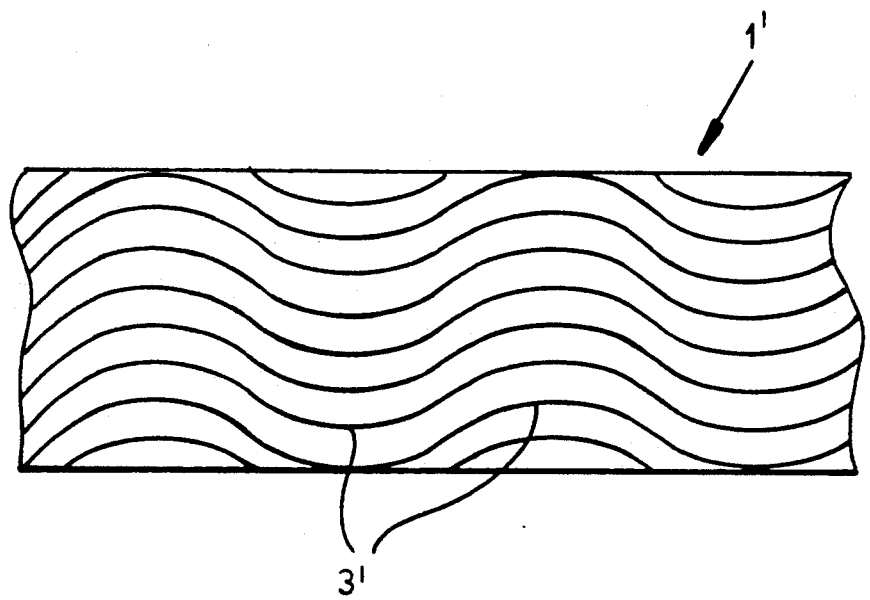
FIGS. 5 and 6 are views like FIGS. 4 and 3, respectively, of another conduit according to the invention.
Figure 6:
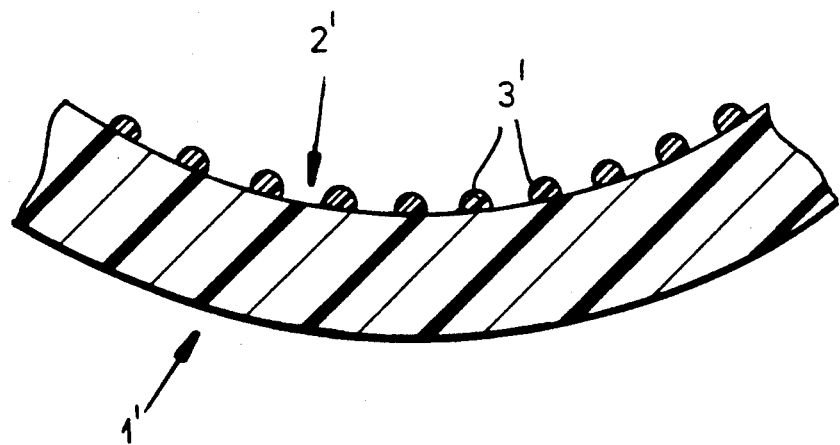

FIGS. 5 and 6 show a tube 1' having an inner wall 1' formed with semicircular-section ridges 3' that do not have straight sections, but run instead as waves, in effect each being formed by a succession of semicircular sections. These ridges 3' are formed of a synthetic resin such as polytetrafluoroethylene that has a substantially lower coefficient of friction than the resin, for instance polyvinyl chloride, forming the tube 1'.

Figure 8:
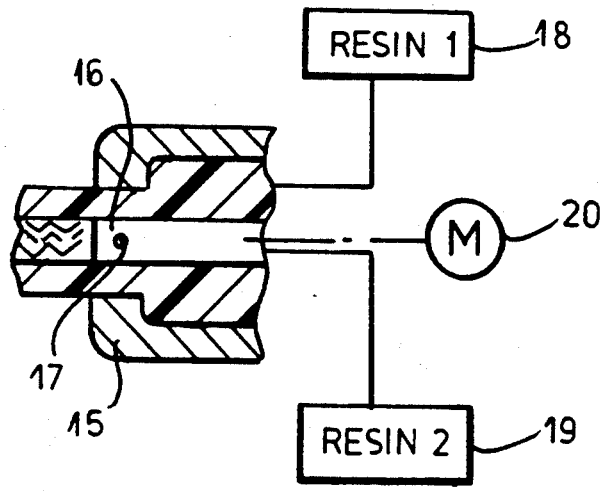

Such a tube 1' is made as shown in FIG. 8 by an extruder 15 having a rotatable mandrel 16 formed with a plurality of radially open ports 17. The tube resin is fed from a supply 18 to the extruder 15 and the ridge resin is fed from a supply 19 to a passage in the mandrel 16 to exit from the ports 17 thereof. A motor 20 rotates the mandrel 16 first in one direction, then in the opposite direction, with a speed increasing and decreasing sinusoidally to produce the ridges 3'.

We claim:

1. A method of making an electrical conduit comprising a tube extending along a longitudinal axis and having an inner wall formed with a plurality of longitudinally throughgoing ridges each formed by a plurality of longitudinally joined portions with every other portion inclined oppositely relative to the axis to the intervening portions, the method comprising the steps of:

forcing the tube longitudinally through an annular opening of an extruder defined internally by an mandrel itself formed with peripheral grooves that form the ridges; and alternately oppositely rotating the mandrel.

2. The method defined in claim 1 wherein the rotation speed of the mandrel is varied continuously to produce ridges of varying pitch.

3. The method defined in claim 1 wherein the mandrel forms the ridges without removal of material.

4. The method defined in claim 1 wherein the ridges are extruded separately and applied to the inner wall.

* * * * *